(12) United States Patent
Wehnes (10) Patent No.: US 9,076,197 B2
(45) Date of Patent: Jul. 7, 2015

(54) PROBABILITY DENSITY FUNCTION ESTIMATION

(75) Inventor: Jeffrey C. Wehnes, Richardson, TX (US)

(73) Assignee: VuComp, Inc., Plano, TX (US)

(*) Notice: Subject to any disclaimer, the term of this patent is extended or adjusted under 35 U.S.C. 154(b) by 161 days.

(21) Appl. No.: 13/695,351

(22) PCT Filed: Apr. 29, 2011

(86) PCT No.: PCT/US2011/034700
§ 371 (c)(1),
(2), (4) Date: Nov. 26, 2012

(87) PCT Pub. No.: WO2011/137411
PCT Pub. Date: Nov. 3, 2011

(65) Prior Publication Data
US 2013/0208967 A1 Aug. 15, 2013

Related U.S. Application Data

(60) Provisional application No. 61/400,573, filed on Jul. 28, 2010, provisional application No. 61/399,094, filed on Jul. 7, 2010, provisional application No. 61/398,571, filed on Jun. 25, 2010, provisional
(Continued)

(51) Int. Cl.
*G06K 9/00* (2006.01)
*G06T 7/00* (2006.01)
(Continued)

(52) U.S. Cl.
CPC ............ *G06T 7/0012* (2013.01); *G06T 7/0081* (2013.01); *G06T 7/0087* (2013.01); *G06T 2207/10116* (2013.01); *G06T 2207/20016* (2013.01); *G06T 2207/30068* (2013.01);
(Continued)

(58) Field of Classification Search
CPC ... G06T 7/0012; G06T 7/0081; G06T 7/0087; G06T 2207/10116; G06T 2207/20116; G06T 2207/30068; G06T 2207/30096; G06T 5/002; G06T 5/10; G06K 9/6267
See application file for complete search history.

(56) References Cited

U.S. PATENT DOCUMENTS

| 4,907,156 A | 3/1990 | Doi et al. |
| 5,109,430 A | 4/1992 | Nishihara et al. |

(Continued)

FOREIGN PATENT DOCUMENTS

| JP | H06149866 A | 5/1994 |
| JP | 2004274431 A | 9/2004 |

(Continued)

OTHER PUBLICATIONS

Adamczak et al., "New developments in the Feature Space Mapping model", 1997, 3rd Conf. Neural Networks, 65-70.*
(Continued)

*Primary Examiner* — Katrina Fujita
(74) *Attorney, Agent, or Firm* — Slater & Matsil, L.L.P.

(57) ABSTRACT

A PDF estimator for determining a probability that a detected object is a specific type of object is provided. Training data from a known set is used to functionally describe the relevant neighborhood for specific representation points. The neighborhood is selected based on the measured features of the object to be classified and weights are calculated to be applied to the representation points. A probability is determined based upon the stored training data, the measured features of the object to be classified, and the weights.

16 Claims, 7 Drawing Sheets

Related U.S. Application Data application No. 61/395,029, filed on May 6, 2010, provisional application No. 61/343,609, filed on May 2, 2010, provisional application No. 61/343,608, filed on May 2, 2010, provisional application No. 61/343,552, filed on May 2, 2010, provisional application No. 61/343,557, filed on Apr. 30, 2010.

(51) Int. Cl.
*G06K 9/62* (2006.01)
*G06T 5/00* (2006.01)
*G06T 5/10* (2006.01)

(52) U.S. Cl.
CPC ..... G06T2207/30096 (2013.01); *G06K 9/6267* (2013.01); *G06T 5/002* (2013.01); *G06T 5/10* (2013.01)

(56) References Cited

U.S. PATENT DOCUMENTS

| | | |
|---|---|---|
| 5,133,020 A | 7/1992 | Giger et al. |
| 5,301,129 A | 4/1994 | McKaughan et al. |
| 5,359,513 A | 10/1994 | Kano et al. |
| 5,638,458 A | 6/1997 | Giger et al. |
| 5,729,620 A | 3/1998 | Wang |
| 5,828,774 A | 10/1998 | Wang |
| 5,917,929 A | 6/1999 | Marshall et al. |
| 5,982,915 A | 11/1999 | Doi et al. |
| 5,987,094 A | 11/1999 | Clarke et al. |
| 6,011,862 A | 1/2000 | Doi et al. |
| 6,014,452 A | 1/2000 | Zhang et al. |
| 6,075,879 A | 6/2000 | Roehrig et al. |
| 6,088,473 A | 7/2000 | Xu et al. |
| 6,125,194 A | 9/2000 | Yeh et al. |
| 6,138,045 A | 10/2000 | Kupinski et al. |
| 6,141,437 A | 10/2000 | Xu et al. |
| 6,198,838 B1 | 3/2001 | Roehrig et al. |
| 6,233,364 B1 | 5/2001 | Krainiouk et al. |
| 6,240,201 B1 | 5/2001 | Xu et al. |
| 6,282,307 B1 | 8/2001 | Armato, III et al. |
| 6,335,980 B1 | 1/2002 | Armato, III et al. |
| 6,404,908 B1 | 6/2002 | Schneider et al. |
| 6,483,934 B2 | 11/2002 | Armato, III et al. |
| 6,549,646 B1 | 4/2003 | Yeh et al. |
| 6,577,752 B2 | 6/2003 | Armato, III et al. |
| 6,609,021 B1 | 8/2003 | Fan et al. |
| 6,654,728 B1 | 11/2003 | Li et al. |
| 6,683,973 B2 | 1/2004 | Li et al. |
| 6,690,816 B2 | 2/2004 | Aylward et al. |
| 6,694,046 B2 | 2/2004 | Doi et al. |
| 6,724,925 B2 | 4/2004 | Armato, III et al. |
| 6,738,499 B1 | 5/2004 | Doi et al. |
| 6,760,468 B1 | 7/2004 | Yeh et al. |
| 6,766,043 B2 | 7/2004 | Zeng et al. |
| 6,795,521 B2 | 9/2004 | Hsu et al. |
| 6,801,645 B1 | 10/2004 | Collins et al. |
| 6,813,375 B2 | 11/2004 | Armato III et al. |
| 7,035,465 B2 * | 4/2006 | Comaniciu et al. ........... 382/190 |
| 7,043,066 B1 | 5/2006 | Doi et al. |
| 7,054,473 B1 | 5/2006 | Roehrig et al. |
| 7,088,850 B2 | 8/2006 | Wei et al. |
| 7,203,349 B2 | 4/2007 | Zhang et al. |
| 7,336,809 B2 | 2/2008 | Zeng et al. |
| 7,346,202 B1 | 3/2008 | Schneider |
| 7,359,538 B2 | 4/2008 | Zeng et al. |
| 7,397,938 B2 | 7/2008 | Cathier |
| 7,403,646 B2 | 7/2008 | Sato |
| 7,480,401 B2 | 1/2009 | Shen et al. |
| 7,492,968 B2 | 2/2009 | Jerebko et al. |
| 7,593,561 B2 | 9/2009 | Zhang et al. |
| 7,616,818 B2 | 11/2009 | Dewaele |
| 7,646,902 B2 | 1/2010 | Chan et al. |
| 8,164,039 B2 | 4/2012 | Bovik et al. |
| 8,165,385 B2 | 4/2012 | Reeves et al. |
| 8,260,014 B2 | 9/2012 | Chen et al. |
| 8,488,863 B2 | 7/2013 | Boucheron |
| 2001/0008562 A1 | 7/2001 | Rogers et al. |
| 2002/0016539 A1 | 2/2002 | Michaelis et al. |
| 2002/0041702 A1 | 4/2002 | Takeo et al. |
| 2003/0007598 A1 | 1/2003 | Wang et al. |
| 2004/0161141 A1 | 8/2004 | Dewaele |
| 2005/0008211 A1 | 1/2005 | Xu et al. |
| 2005/0010106 A1 | 1/2005 | Lang et al. |
| 2006/0083418 A1 | 4/2006 | Watson et al. |
| 2006/0171573 A1 | 8/2006 | Rogers |
| 2006/0177125 A1 | 8/2006 | Chan et al. |
| 2006/0239541 A1 | 10/2006 | Florin et al. |
| 2006/0285751 A1 | 12/2006 | Wu et al. |
| 2007/0019852 A1 | 1/2007 | Schildkraut et al. |
| 2007/0092864 A1 | 4/2007 | Reinhardt et al. |
| 2007/0237401 A1 | 10/2007 | Coath et al. |
| 2008/0002873 A1 | 1/2008 | Reeves et al. |
| 2008/0037852 A1 | 2/2008 | Zhou et al. |
| 2008/0037853 A1 | 2/2008 | Bernard et al. |
| 2008/0069425 A1 | 3/2008 | Liu et al. |
| 2008/0292194 A1 | 11/2008 | Scmidt et al. |
| 2008/0298666 A1 | 12/2008 | Mysore Siddu et al. |
| 2008/0317322 A1 | 12/2008 | Acharyya et al. |
| 2009/0052756 A1 | 2/2009 | Saddi et al. |
| 2009/0052763 A1 | 2/2009 | Acharyya et al. |
| 2009/0060297 A1 * | 3/2009 | Penn et al. ................... 382/128 |
| 2009/0097730 A1 | 4/2009 | Kasai et al. |
| 2009/0116716 A1 | 5/2009 | Zhou |
| 2009/0129657 A1 | 5/2009 | Huo et al. |
| 2009/0171236 A1 | 7/2009 | Davies |
| 2009/0180674 A1 | 7/2009 | Chen et al. |
| 2009/0214099 A1 | 8/2009 | Merlet |
| 2010/0002929 A1 | 1/2010 | Sammak et al. |
| 2010/0008424 A1 | 1/2010 | Pace |
| 2010/0054563 A1 | 3/2010 | Mendonca et al. |
| 2010/0098343 A1 | 4/2010 | Perronnin et al. |
| 2010/0104148 A1 | 4/2010 | Bovik et al. |
| 2010/0208998 A1 | 8/2010 | Van Droogenbroeck et al. |
| 2011/0274327 A1 | 11/2011 | Wehnes et al. |
| 2011/0280465 A1 | 11/2011 | Wehnes et al. |
| 2012/0294502 A1 | 11/2012 | Chan et al. |

FOREIGN PATENT DOCUMENTS

| | | |
|---|---|---|
| JP | 2008046864 | 2/2008 |
| JP | 2010532898 A | 10/2010 |
| WO | WO 2011/137407 | 11/2011 |
| WO | WO 2011/137409 | 11/2011 |
| WO | WO 2011/137410 | 11/2011 |
| WO | WO 2011/137411 | 11/2011 |
| WO | WO 2012/006318 | 1/2012 |

OTHER PUBLICATIONS

Elgammal et al., "Probabilistic Tracking in Joint Feature-Spatial Spaces", 2003, Computer Vision and Pattern Recognition, 2003. Proceedings. 2003 IEEE Computer Society Conference on, vol. 1, I-781-I-788.*

Mittal et al., "Motion-Based Background Subtraction using Adaptive Kernel Density Estimation", 2004, Computer Vision and Pattern Recognition, 2004. CVPR 2004. Proceedings of the 2004 IEEE Computer Society Conference on, vol. 2, II-302-II-309.*

Shamir "Feature-Space Analysis of Unstructured Meshes", 2003, IEEE Visualization, 185-192.*

Tanaka et al., "A fast algorithm for adaptive background model construction using parzen density estimation", Advanced Video and Signal Based Surveillance, 2007. AVSS 2007. IEEE Conference on, 528-533.*

"CheckMate™ Ultra with PeerView™ Feature," Product Brochure, R2 Technology, Inc., circa 2002.

"The ImageChecker® Technology," Patient Pamphlet, R2 Technology, Inc., circa 2002.

"ImageChecker™ CT: Server DICOM Conformance Statement," PN 390-00-448 Rev. C, R2 Technology, Inc., Sep. 2003.

"ImageChecker™ CT: Workstation DICOM Conformance Statement," PN 390-00-449 Rev. D, R2 Technology, Inc., Sep. 2003.

(56) References Cited

OTHER PUBLICATIONS

"Improving Sensitivity and Efficiency in Lung CT Nodule Detection," ImageChecker® CT LN-1000, Product Brochure, R2 Technology, Inc., circa 2003.
"Improving Sensitivity and Efficiency in Lung CT Nodule Detection," ImageChecker® CT, Product Brochure, R2 Technology, Inc., circa 2003.
"Integrated Tools for Streamlined Review of MDCT Lung Exams," ImageChecker® CT LN-500, Product Brochure, R2 Technology, Inc., circa 2003.
"OmniCad," Product Brochure, R2 Technology, Inc., Oct. 16, 2003.
"R2 Algorithm: The Intuitive Choice," Product Brochure, R2 Technology, Inc., 2003.
"The Total CAD Solution for Film and Digital Mammography," ImageChecker® DM, Product Brochure, R2 Technology, Inc., 2003.
"CheckMate™ Ultra with PeerView™," Webpage, http://www.r2tech.com/prd/prd005.html, R2 Technology, Inc., 2004, downloaded Jan. 16, 2004.
"Technical Specifications Sheet for the ImageChecker® Display Units," R2 Technology, Inc., 2004.
"Technical Specifications Sheet for the ImageChecker® Processing Units," R2 Technology, Inc., 2004.
R2 Technology, Inc. Products Overview Webpage, http://www.r2tech.com/prd/index.html, downloaded Jan. 16, 2004, 1 page.
Van Wijk, C. et al., "Detection and Segmentation of Colonic Polyps on Implicit Isosurfaces by Second Principal Curvature Flow," IEEE Transactions on Medical Imaging, vol. 29, No. 3, Mar. 2010, pp. 688-698.
PCT International Search Report for International Application No. PCT/US2011/034700, mailed Aug. 17, 2011, 2 pages.
PCT International Written Opinion for International Application No. PCT/US2011/034700, mailed Aug. 17, 2011, 5 pages.
PCT International Preliminary Report on Patentability for International Application No. PCT/US2011/034700, mailed Nov. 6, 2012, 6 pages.
R2 Technology, Inc. ImageChecker® Product Webpage, archived at http://web.archive.org/web/20040422174630/http://www.r2tech.com/prd/prd002.html, archive date Apr. 22, 2004, downloaded Jan. 7, 2013, 2 pages.
R2 Technology, Inc. Algorithm Webpage, archived at http://web.archive.org/web/20040225065830/http://www.r2tech.com/prd/prd001.html, archive date Feb. 25, 2004, downloaded Jan. 7, 2013, 2 pages.
R2 Technology, Inc. Products Overview Webpage, archived at http://web.archive.org/web/20040216010921/http://www.r2tech.com/prd.index.html, archive date Feb. 16, 2004, downloaded Jan. 7, 2013, 5 pages.
Hamamoto, "Classifier in statistical pattern recognition—For enhancement of recognition performance," Image Labo, Japan, Japan Industrial Publishing Co., Ltd., vol. 18, No. 11, Nov. 1, 2007, 8 pages.
Japanese Office Action received in Application No. 2013-508076 mailed Jan. 13, 2015, 7 pages.
Tanaka, et al., "Use of Fast Algorithm for Adaptive Background Modeling with Parzen Density Estimation to Detect Objects," The Journal of the Institute of Image Information and Television Engineers, Japan, The Institute of Image Information and Tele4vision Engineers, Jan. 27, 2013, 9 pages.

* cited by examiner

PROBABILITY DENSITY FUNCTION ESTIMATION

This application claims the benefit of U.S. Provisional Application Ser. No. 61/343,609, filed on Apr. 30, 2010, U.S. Provisional Application Ser. No. 61/343,608, filed on Apr. 30, 2010, U.S. Provisional Application Ser. No. 61/343,552, filed on Apr. 30, 2010, U.S. Provisional Application Ser. No. 61/343,557, filed on Apr. 30, 2010, U.S. Provisional Application Ser. No. 61/395,029, filed on May 5, 2010, U.S. Provisional Application Ser. No. 61/398,571, filed on Jun. 25, 2010, U.S. Provisional Application Ser. No. 61/399,094, filed on Jul. 6, 2010, U.S. Provisional Application Ser. No. 61/400,573, filed on Jul. 28, 2010, all of which applications are hereby incorporated herein by reference.

TECHNICAL FIELD

The present disclosure relates generally to pattern recognition, estimation, and, more particularly, to a system and method for classifying an object as one of a set of possible objects.

BACKGROUND

A probability density function (PDF) describes the relative likelihood of observing any given sample value of a random variable. The integral of a PDF over all possible values is 1; the integral of a PDF over a subset of the random variable's range expresses the probability that a drawn sample of a random variable will fall within that range.

PDFs that can be expressed by a closed-form equation are generally well understood, and many applications for such PDFs have been developed. On the other hand, the practical estimation of a PDF for a complex multidimensional random variable, particularly one with an unknown and possibly irregular distribution in each dimension, and/or long, sparsely populated tails, has in large part eluded researchers. In the area of pattern and image recognition, for instance, many researchers have abandoned PDF approaches and concentrated on known solvable alternatives, such as Neural Networks and linear discriminant functions, due to the practical difficulties in applying a PDF approach.

BRIEF DESCRIPTION OF THE DRAWINGS

The following is a brief description of the drawings, which illustrate exemplary embodiments of the present invention and in which.

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For example, embodiments discussed herein are generally described in terms of assisting medical personnel in the examination of breast x-ray images, such as those that may be obtained in the course of performing a mammogram by locating and classifying possible anomalies for review by medical personnel. Other embodiments, however, may be used for other situations, including, for example, analyzing, detecting, and/or classifying data/features in other tissues such as lung tissue, any type of image analysis for statistical anomalies, variations or anomalies in financial markets, sports statistics, financial data, market data, usage data, performance data, weather/climate data, network usage data, structural data, thermal data, cryptography data, audio and video data, geological data (e.g., oil and gas exploration), sonar and radar data, spectral analysis data, and the like.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Figure 1:
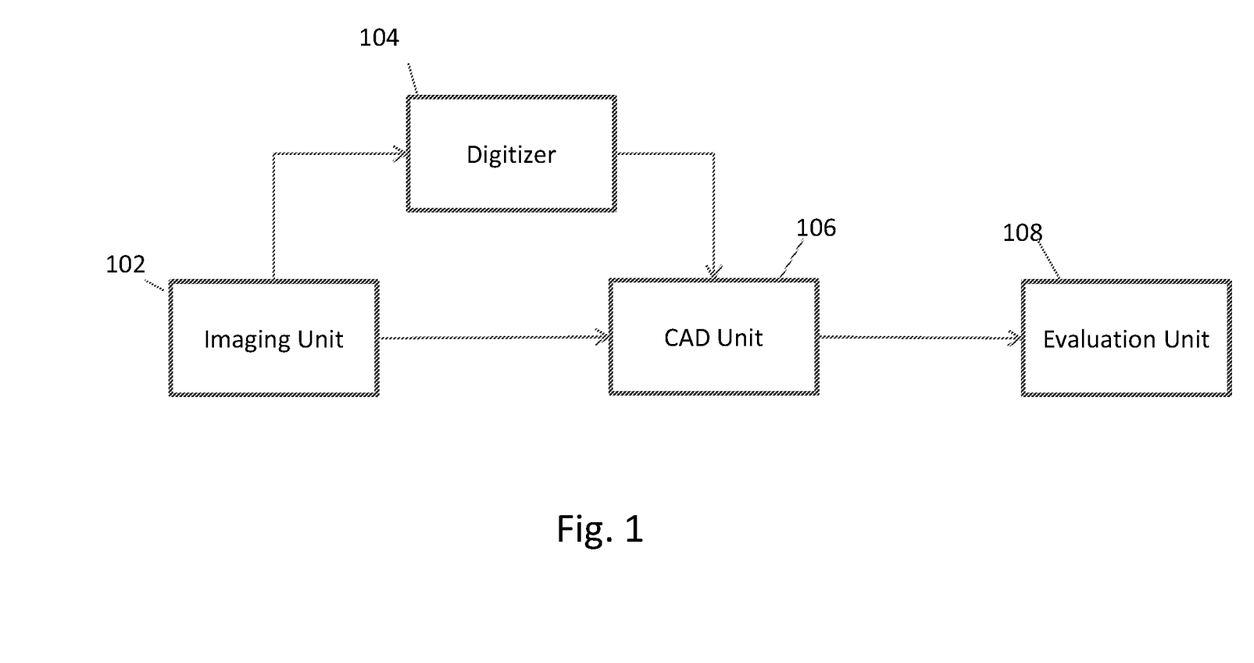
FIG. 1 is a system-level diagram for an anomaly detection system in accordance with an embodiment.

Referring first to FIG. 1, a system 100 for assisting in detecting anomalies during, for example, mammograms, is illustrated in accordance with an embodiment. The system 100 includes an imaging unit 102, a digitizer 104, and a Computer-Aided Detection (CAD) unit 106. The imaging unit 102 captures one or more or other images, such as x-ray images, of the area of interest, such as the breast tissue. In the embodiment in which the system 100 is used to assist in analyzing a mammogram, a series of four x-ray images may be taken while the breast is compressed to spread the breast tissue, thereby aiding in the detection of anomalies. The series of four x-ray images include a top-down image, referred to as a cranio caudal (CC) image, for each of the right and left breasts, and an oblique angled image taken from the top of the sternum angled downwards toward the outside of the body, referred to as the medio lateral oblique (MLO) image, for each of the right and left breasts.

The one or more images may be embodied on film or digitized. Historically the one or more images are embodied as x-ray images on film, but current technology allows for x-ray images to be captured directly as digital images in much the same way as modern digital cameras. As illustrated in FIG. 1, a digitizer 104 allows for digitization of film images into a digital format. The digital images may be formatted in any suitable format, such as industry standard Digital Imaging and Communications in Medicine (DICOM) format.

The digitized images, e.g., the digitized film images or images captured directly as digital images, are provided to a Computer-Aided Detection (CAD) unit 106. As discussed in greater detail below, the CAD unit 106 processes the one or more images to detect possible locations of various types of anomalies, such as calcifications, relatively dense regions, distortions, and/or the like. Once processed, locations of the possible anomalies, and optionally the digitized images, are provided to an evaluation unit 108 for viewing by a radiologist, the attending doctor, or other personnel, with or without markings indicating positions of any detected possible anomalies. The evaluation unit 108 may comprise a display, a workstation, portable device, and/or the like.

Figure 2:
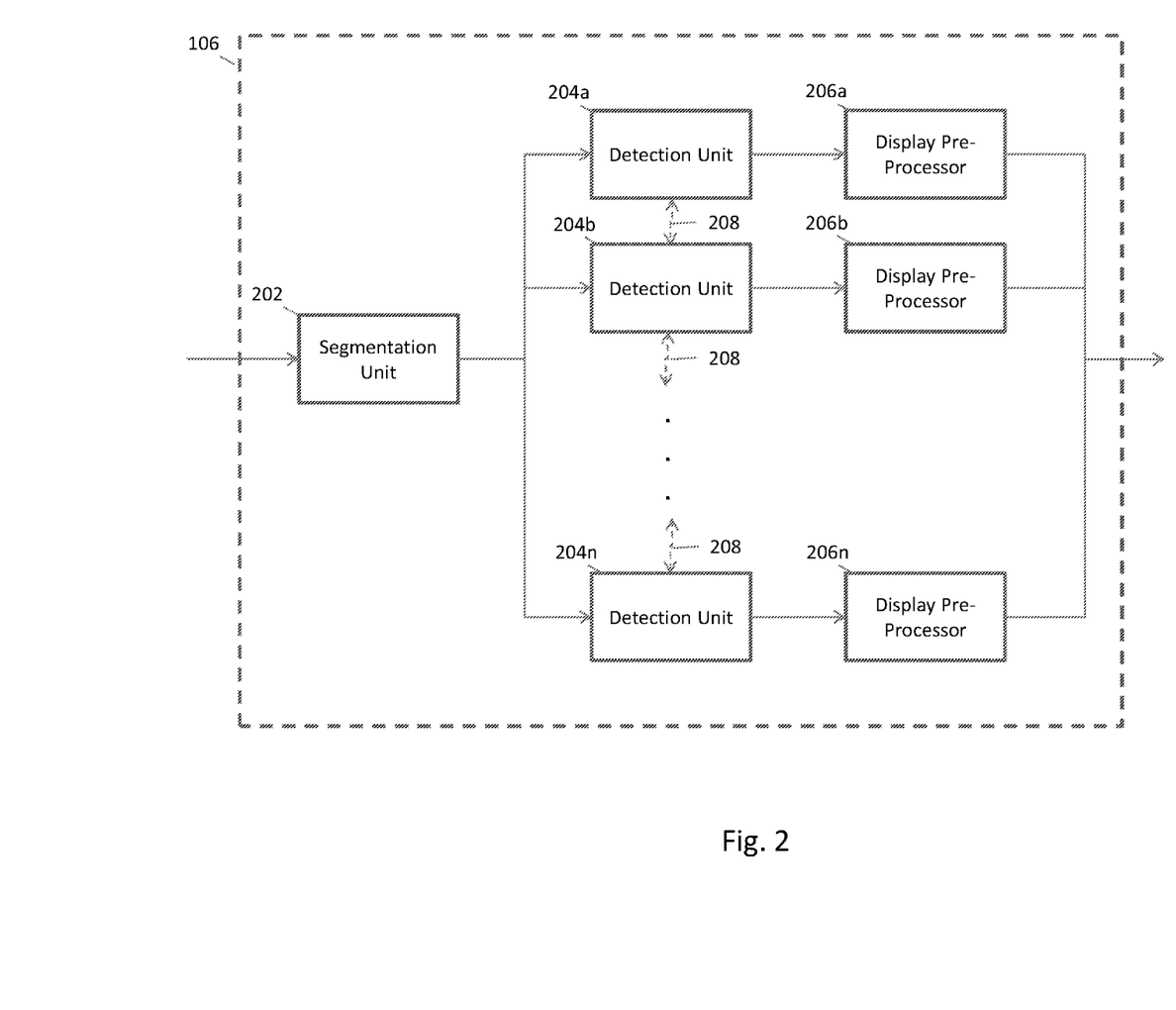
FIG. 2 is a component diagram of a Computer-Aided Detection (CAD) unit in accordance with an embodiment.

FIG. 2 illustrates components that may be utilized by the CAD unit 106 (see FIG. 1) in accordance with an embodiment. Generally, the CAD unit 106 includes a segmentation unit 202, one or more detection units 204a-204n, and one or more display pre-processors 206a-206n. As will be appreciated, an x-ray image, or other image, may include regions other than those regions of interest. For example, an x-ray image of a breast may include background regions as well as other structural regions such as the pectoral muscle. In these situations, it may be desirable to segment the x-ray image to define a search area, e.g., a bounded region defining the breast tissue, on which the one or more detection units 204a-204n is to analyze for anomalies.

The one or more detection units 204a-204c analyze the one or more images, or specific regions as defined by the segmentation unit 202, to detect specific types of features that may indicate one or more specific types of anomalies in the patient. For example, in an embodiment for use in examining human breast tissue, the detection units 204a-204n may comprise a calcification unit, a density (mass) unit, and a distortion unit. As is known in the medical field, the human body often reacts to cancerous cells by surrounding the cancerous cells with calcium, creating micro-calcifications. These micro-calcifications may appear as small, bright regions in the x-ray image. The calcification unit detects and identifies these regions of the breast as possible micro-calcifications.

It is further known that cancerous regions tend to be denser than surrounding tissue, so a region appearing as a generally brighter region indicating denser tissue than the surrounding tissue may indicate a cancerous region. Accordingly, the density unit analyzes the one or more breast x-ray images to detect relatively dense regions in the one or more images. Because the random overlap of normal breast tissue may sometimes appear suspicious, in some embodiments the density unit may correlate different views of an object, e.g., a breast, to determine if the dense region is present in other corresponding views. If the dense region appears in multiple views, then there is a higher likelihood that the region is truly malignant.

The distortion unit detects structural defects resulting from cancerous cells effect on the surrounding tissue. Cancerous cells frequently have the effect of "pulling in" surrounding tissue, resulting in spiculations that appear as a stretch mark, star pattern, or other linear line patterns.

It should be noted that the above examples of the detection units 204a-204n, e.g., the calcification unit, the density unit, and the distortion unit, are provided for illustrative purposes only and that other embodiments may include more or fewer detection units. It should also be noted that some detection units may interact with other detection units, as indicated by the dotted line 208. The detection units 204a-204n are discussed in greater detail below with reference to FIG. 3.

The display pre-processors 206a-206n create image data to indicate the location and/or the type of anomaly. For example, micro-calcifications may be indicated by a line encircling the area of concern by one type of line, while spiculations (or other type of anomaly) may be indicated by a line encircling the area of concern by another type of line.

Figure 3:
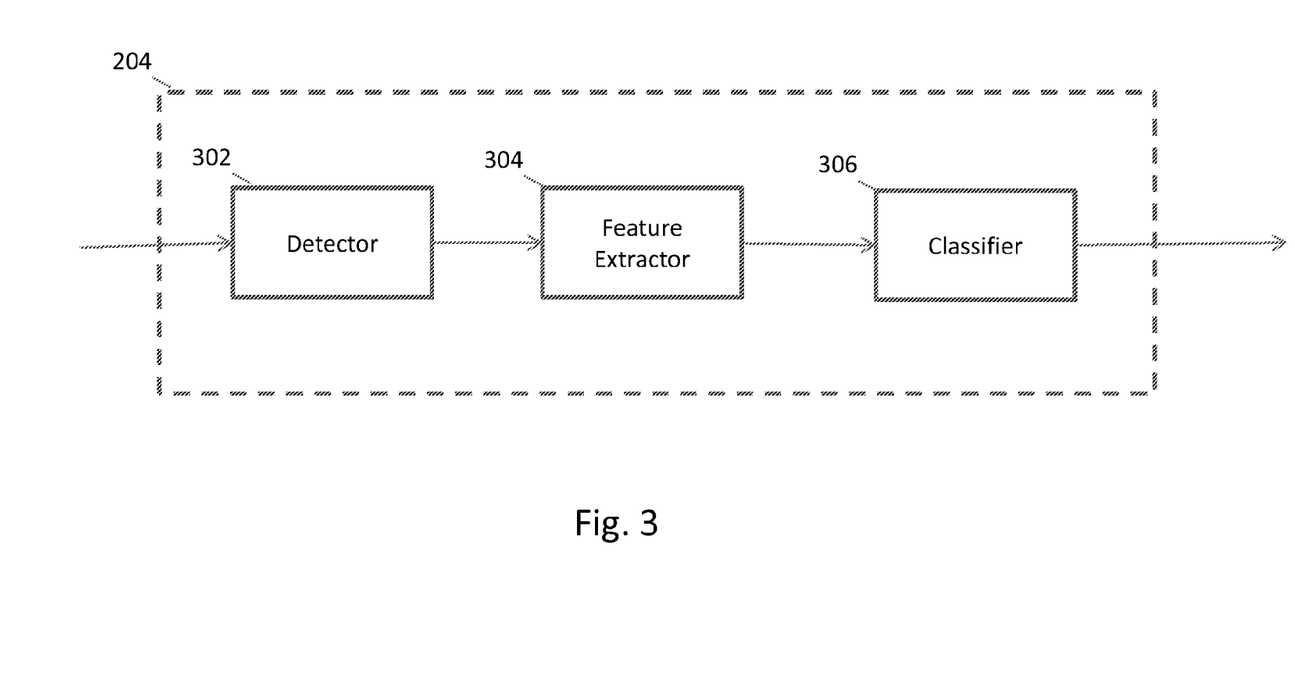
FIG. 3 is a component diagram of a detection unit in accordance with an embodiment.

FIG. 3 illustrates components of that may be utilized for each of the detection units 204a-204n in accordance with an embodiment. Generally, each of the detection units 204a-204n may include a detector 302, a feature extractor 304, and a classifier 306. The detector 302 analyzes the image to identify attributes indicative of the type of anomaly that the detection unit is designed to detect, such as calcifications, and the feature extractor 304 extracts predetermined features of each detected region. For example, the predetermined features may include the size, the signal-to-noise ratio, location, and the like.

The classifier 306 examines each extracted feature from the feature extractor 304 and determines a probability that the extracted feature is an abnormality. Once the probability is determined, the results are compared to a threshold to determine whether or not a detected region is to be reported as a possible area of concern.

A suitable segmentation unit 202 is specified in U.S. Provisional Application Ser. Nos. 61/400,573 and 61/398,571, suitable detection units for use in detecting and classifying microcalcifications are specified in U.S. Provisional Application Ser. Nos. 61/343,557 and 61/343,609 and co-filed U.S. patent application Ser. No. 13/695,347, a suitable detection unit for detecting and classifying malignant masses is specified in U.S. Provisional Application Ser. No. 61/343,552 and co-filed U.S. patent application Ser. No. 13/695,357, a suitable detection unit for detecting and classifying spiculated malignant masses is specified in U.S. Provisional Application Ser. No. 61/395,029 and co-filed U.S. patent application Ser. No. 13/695,369, and suitable display pre-processors are specified in U.S. Provisional Application Ser. Nos. 61/399,094, all of which are incorporated herein by reference.

The following paragraphs provide greater details regarding a PDF estimator that may be used by, for example, one or more of the classifiers 308 (see FIG. 3) within the detection units 204a-204n (see FIG. 2), in accordance with an embodiment.

Figure 4A:
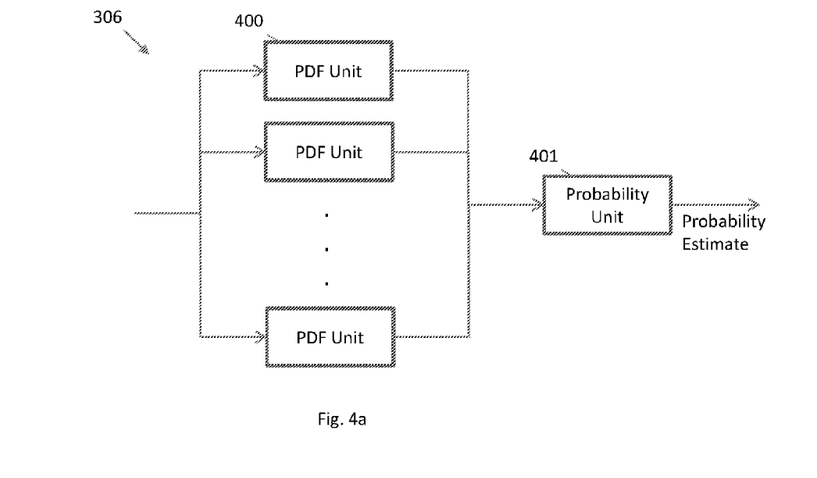
FIGS. 4a and 4b illustrate a classifier probability unit in accordance with an embodiment.
Figure 4B:
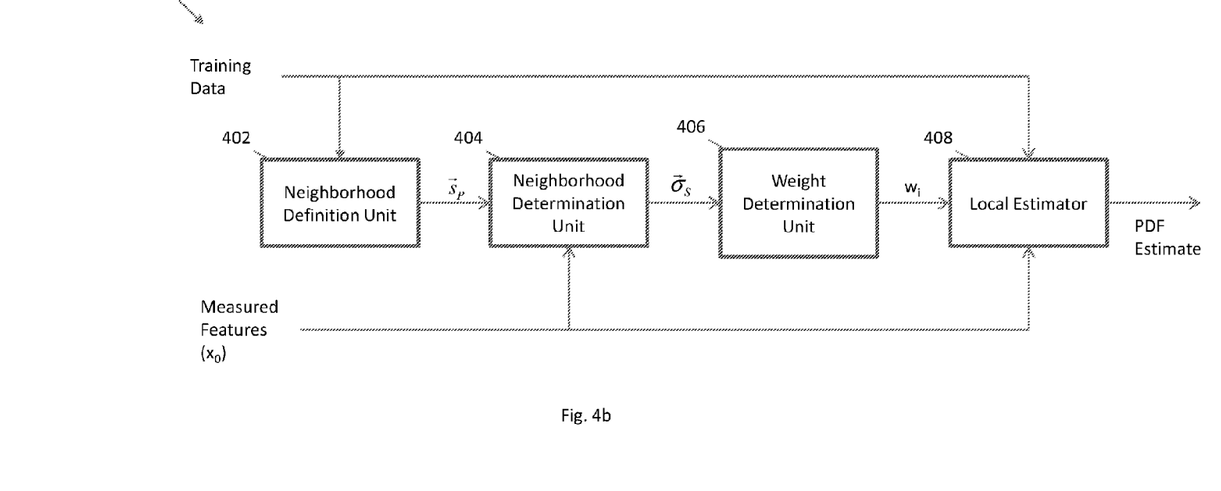

FIGS. 4a and 4b illustrate an example of a classifier 306 that may be used in an embodiment. Generally, the classifier estimates the probability that an evaluation point belongs to a particular class by first estimating the PDF value for each of two or more classes and then combining the different class PDF values into a probability. The combining of PDF values to estimate a probability can be performed using techniques such as the well-known Bayes' law. The classifier could also use the PDF estimates to generate likelihood ratios instead of probability values. In this embodiment, the classifier 306 includes one or more PDF units 400 providing PDF estimates to a Probability unit 401. Generally, the PDF units 400 determine a PDF estimate for each possible classification for an object. For example, in an embodiment in which the classifier 306 is utilized to classify a microcalcification, there may be a PDF unit 400 for each of a malignant microcalcification, a benign microcalcification, a lucent microcalcification, a vascular microcalcification, a film artifact, and anything else. Greater detail regarding the PDF unit 400 is provided below.

Referring now to FIG. 4b, a PDF estimator 400 that may be used by the classifier 306 (see FIG. 3) in accordance with an embodiment is shown, although different classifier probability units may be utilized. A neighborhood definition unit 402 of the PDF Estimator unit 400 functionally defines neighborhood sizes for each representation point or bin of representation points. In some embodiments a variable neighborhood size may be desirable in order to allow for a functional description that better fits the actual measured feature data. In this embodiment, the neighborhood definition unit 402 evaluates training data received, e.g., from a database, and determines the appropriate neighborhood sizes for the representation points included in the training data. The neighborhood definition unit 402 provides vector $\vec{s}_p$ (a vector representing scale parameters for each representation point or bin of representation points for each feature or dimension) to a neighborhood determination unit 404. In an embodiment, the neighborhood definition unit 402 is performed off-line and the results, e.g., $\vec{s}_p$, are stored, such as being stored in a database, for later access. The vector $\vec{s}_p$ is utilized by the neighborhood determination unit 404 to determine a scale parameter vector $\vec{\sigma}_s$—the size of the neighborhood to be used for the evaluation point $x_0$ for each dimension or feature. The scale parameter vector $\vec{\sigma}_s$ is provided to a weight determination unit 406 to determine weights $w_i$, which specifies how much weight to allocate to representation points of the training data. Once determined, the weights $w_i$ are provided to a local estimator 408. The local estimator 408 applies the weights $w_i$ to the training data to determine a PDF estimate for the point $x_0$, which may be stored, e.g., in a database. The following paragraphs provide greater detail.

PDF estimation for real-world multivariable systems with complex and/or sparse long-tailed distributions has historically been thwarted by several inherent difficulties. First, the well-studied, but highly-constrained, parametric models are often unable to accurately represent PDFs encountered in real-world applications. Second, if the models used are highly flexible or nonparametric, (for example, Parzen window based approaches) then the estimated values can be unreliable due to random sample variation. This is particularly true in the tail regions of a PDF where there are few samples. Methods to improve estimator reliability can result in intractable computation or memory requirements.

Embodiments described herein take a novel approach to PDF estimation. Instead of estimating and storing a complete PDF, a data set is stored that allows on-the-fly estimation of a PDF value for any specific local region in the PDF. The amount of data required to store an estimated PDF in this manner can be on the order of n×M, where n is the dimensionality of the system and M is a number of representation points, $r_i$. Each representation point represents one or more samples from the actual distribution that is being estimated. For instance, each sample in a sample set can receive its own representation point, with a unit weighting. Each sample can alternately be expressed through a representation point with a weight less than one. For instance, if two different multidimensional measurements are believed to originate from the same sample, each of the two samples can be given a representation point with a weight of 0.5. Finally, a representation point can "bin" several samples that are close in measurement space, by replacing the samples with a single representation point with a weight equal to the weights of the individual samples. The actual multidimensional sample value for a binned samples representation point can be the center of the bin, the mean of the binned samples, the median of the binned sample values in each dimension, etc.

In addition to the representation points, several other inputs are selected prior to performing estimation. One input is the evaluation point, $x_0$, at which the PDF is to be estimated. Another input is a vector $\vec{s}_p$, provided by the neighborhood definition unit 402 in an embodiment, represents a set of parameters that allow computation of a scale parameter vector, $\vec{\sigma}_s$. The scale parameter vector determines which of the representation points will be used in the estimation, and also can be a parameter for a function that determines the weight to be applied to each included point. Another input is the weighting function, $g(\vec{\sigma}_s)$, that will actually be applied to the representation points used in the estimation. The final input is a parameterized estimator function, $f(x_0, \theta)$, where $\theta$ is a parameter matrix for the function.

Figure 5:
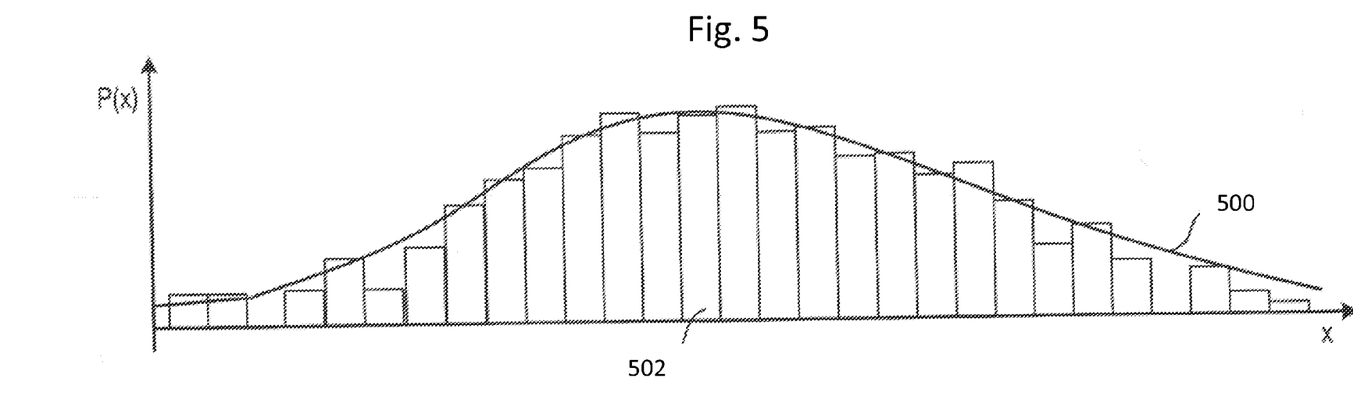
FIG. 5 illustrates a closed form PDF and a histogram of a sample distribution drawn from the probability distribution.

FIG. 5 shows a generic PDF 500 for a one-dimensional random variable, superimposed on a histogram of a sample distribution drawn from the population of samples 502 of the same random variable. With a large enough number of points, the histogram will tend towards a quantized version of the shape of PDF 500, which may be estimated by a prior art technique such as a Parzen window. Towards the tails of PDF 500, such an approach has difficulty producing a reliable estimate. The small number of samples often present in the tails means that in the tails, a simple windowed estimate either has high variance, due to the small number of samples, or fails to account for the true shape of the actual PDF, due to the application of a large linear window.

In preferred embodiments, the input data includes precalculated parameters from which an appropriate scale parameter can be calculated for any input evaluation point by, for example, the neighborhood determination unit 404. Generally, the scale parameter will be larger towards the tails of the distribution, and smaller in more data-rich areas of the representation point space. Although a separate data structure can be used to store a description of the scale parameter over all sample space, in one embodiment each representation point stores parameters that can be used to calculate a scale parameter vector on the fly.

Figure 6:
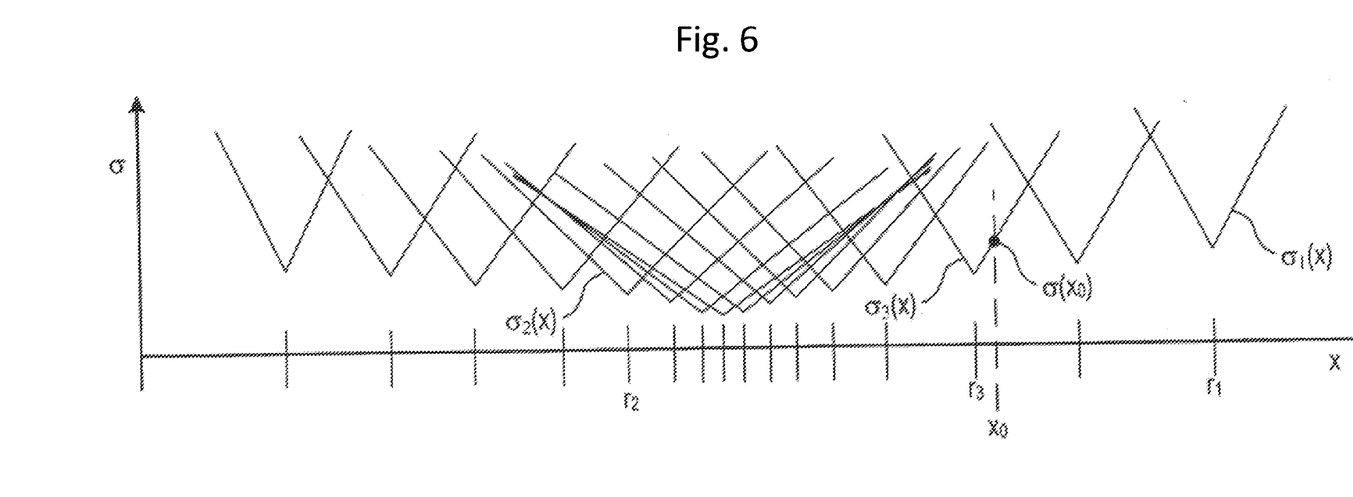
FIG. 6 shows, conceptually, estimation of a sigma value for a hypothetical one-dimensional distribution expressed by a set of representation points.

FIG. 6 illustrates one embodiment of representation-point scale parameter storage and usage, where each representation point $r_i$ also describes a minimum scale parameter value $\sigma_{MIN}(i)$ and a scale parameter slope $\sigma_{do}(i)$ for a scale parameter function $\sigma_i(x_0)=\sigma_{MIN}(i)+\sigma_{do}(i)|x_0-r_i|$. Thus for any evaluation point $x_0$, the scale parameter function allows calculation of a scale parameter. The scale parameter for use with an evaluation point can thus be defined as the minimum scale parameter function value $\sigma_i(x_0)$, evaluated for all i, which minimum values $\vec{\sigma}_s$ are provided to the weight determination unit 406. In practical applications, the scale parameter may need only be evaluated for representation points close to the evaluation point. This can be seen by an inspection of FIG. 6, where scale parameter functions $\sigma_i(x)$ are plotted for each evaluation point ($\sigma_1(x)$, for $r_1$, $\sigma_2(x)$, for $r_2$, $\sigma_3(x)$, for $r_3$, are labeled). The value $\sigma_3(x_0)$ is lower than the scale parameter function values associated with all other representation points, and is thus selected as the scale parameter for evaluation point $x_0$. Alternatively, the different scale parameter function values could be combined with mathematical functions other than "min" (for example, the mean or a particular percentile of the different values could be used).

With multiple dimensions, a different scale parameter will typically be found for each dimension, depending on the local sparseness of representation points around $x_0$ in that dimension.

Figure 7:
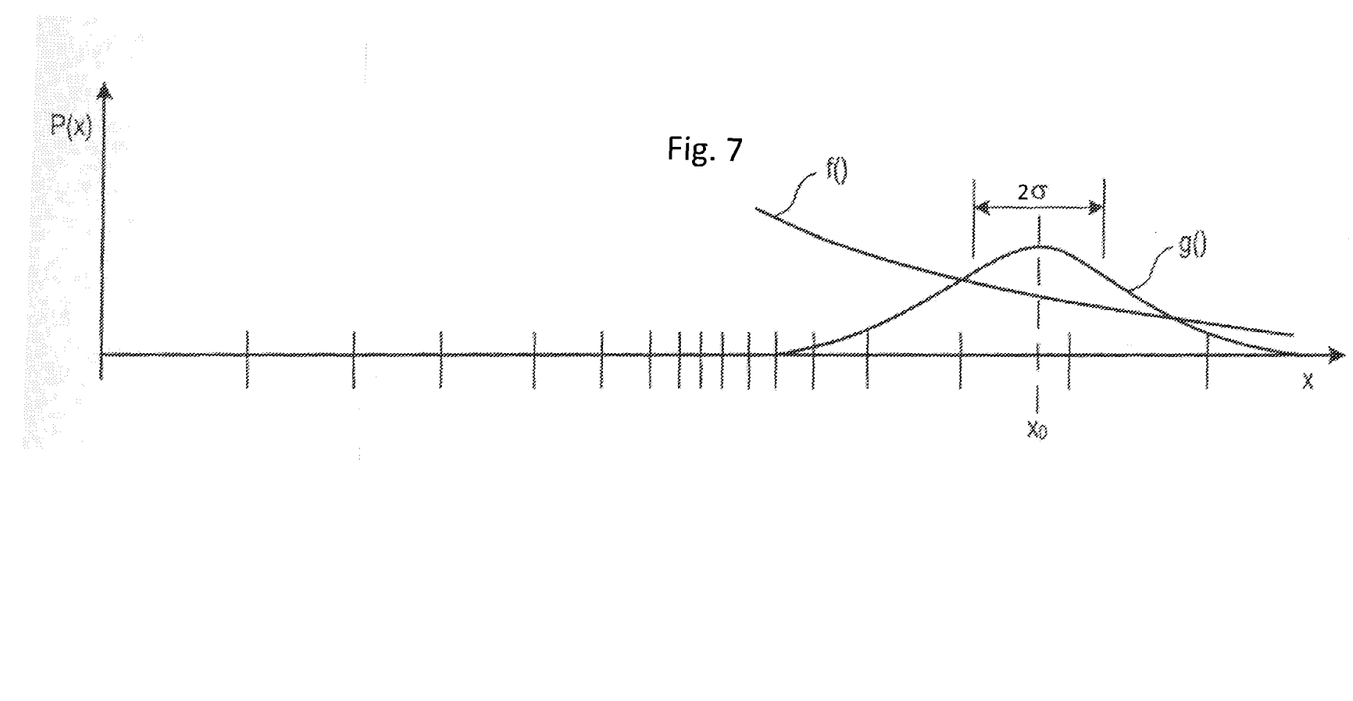
FIG. 7 shows application of the FIG. 6 sigma value to estimation of the PDF at the evaluation point.

Once the scale parameter for each dimension is found, the scale parameter can next be used to limit the representation points that will be used to estimate the PDF at the evaluation point. For instance, a practical rule of thumb based on distance from the evaluation point, such as a multiple of the scale factor, can be used to exclude representation points that practically cannot affect the calculation as illustrated in FIG. 7, thus saving computation time. Alternately, all representation points can be evaluated, no matter how far they lie from the evaluation point.

The scale parameter is also employed to calculate an overall weight for each representation point using the defined weighting function $w_i = g(r_i; x_0, \sigma(x_0))$, as illustrated by the weight determination unit 406 (FIG. 4).

The selected, weighted representation points are used to calculate a parameter matrix, $\theta$, for the parameterized estimator function $f(x, \theta)$ calculated by the local estimator 408. In an embodiment, the parameter matrix is calculated to maximize the function:

$$\sum_i [w_i \cdot h(f(r_i, \theta))],$$

where h( ) is a monotonic function.

For some function selections, when the modeled PDF is nonzero for all points in n-dimensional space, equations can be used to solve for the parameter matrix. In one such embodiment, the weight function g( ) is a Gaussian function, h( ) is a log function, and f( ) is a second-order exponential function: $f(x, \theta) = C \cdot e^{\theta_1 x^2 + \theta_2 x}$, where $$C = \frac{1}{N} \frac{\sum_i g(r_i; x_0, \sigma(x_0))}{\int_x g(x; x_0, \sigma(x_0)) e^{\theta_1 x^2 + \theta_2 x}}$$

and N is the number of representation points.

In a multidimensional solution, the above equations are still applied, with the understanding that the variables and parameters are multidimensional.

The general approach described above can also be applied where the PDF has a zero value in some parts of n-dimensional space. The approach can also be applied where h, g, or f are not in a directly solvable form. In such cases, the parameter matrix can be approximated using numerical methods, such as Newton-Rhapson optimization.

Once the parameter matrix for the estimator function has been found, it is now possible to evaluate the estimator function at the evaluation point to obtain a PDF value.

A wide variety of applications exist for PDF techniques according to an embodiment. Some disciplines that can benefit from accurate PDF estimation include pattern recognition, classification, estimation, computer vision, image processing, and signal processing. The compact space requirements of the PDF estimation data add practicality for PDF data set compact storage, update distribution, the inclusion of additional discriminant variables and/or classes, etc.

Unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

Figure 8:
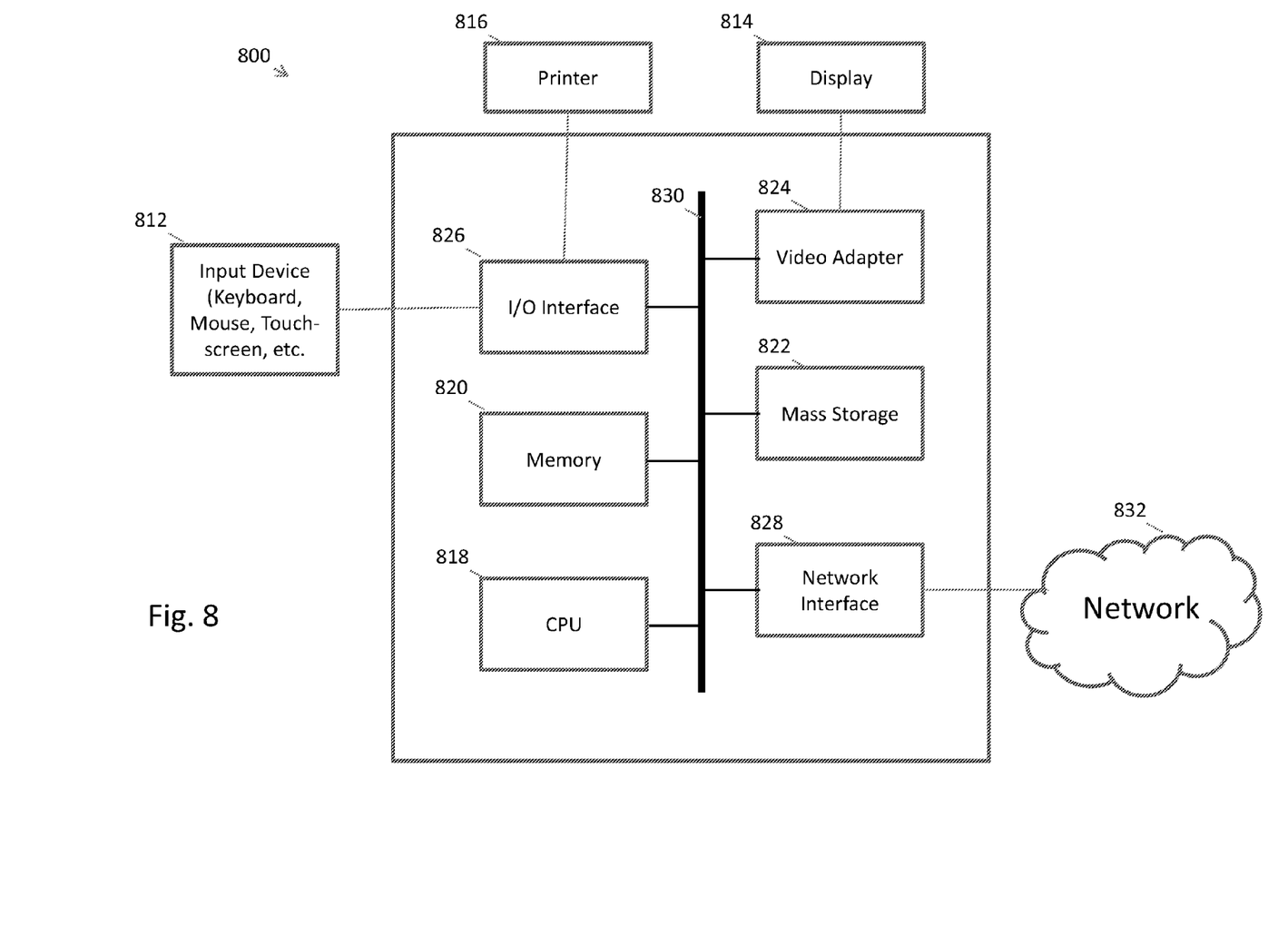
FIG. 8 is a block diagram of a desktop computing device in accordance with an embodiment of the present invention.

For example, FIG. 8 is a block diagram of a computing system 800 that may also be used in accordance with an embodiment. It should be noted, however, that the computing system 800 discussed herein is provided for illustrative purposes only and that other devices may be used. The computing system 800 may comprise, for example, a desktop computer, a workstation, a laptop computer, a personal digital assistant, a dedicated unit customized for a particular application, or the like. Accordingly, the components of the computing system 800 disclosed herein are for illustrative purposes only and other embodiments of the present invention may include additional or fewer components.

In an embodiment, the computing system 800 comprises a processing unit 810 equipped with one or more input devices 812 (e.g., a mouse, a keyboard, or the like), and one or more output devices, such as a display 814, a printer 816, or the like. Preferably, the processing unit 810 includes a central processing unit (CPU) 818, memory 820, a mass storage device 822, a video adapter 824, an I/O interface 826, and a network interface 828 connected to a bus 830. The bus 830 may be one or more of any type of several bus architectures including a memory bus or memory controller, a peripheral bus, video bus, or the like. The CPU 818 may comprise any type of electronic data processor. For example, the CPU 818 may comprise a processor (e.g., single core or multi-core) from Intel Corp. or Advanced Micro Devices, Inc., a Reduced Instruction Set Computer (RISC), an Application-Specific Integrated Circuit (ASIC), or the like. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for data storage for use while executing programs. The memory 820 may include one of more non-transitory memories.

The mass storage device 822 may comprise any type of storage device configured to store data, programs, and other information and to make the data, programs, and other information accessible via the bus 828. In an embodiment, the mass storage device 822 is configured to store the program to be executed by the CPU 818. The mass storage device 822 may comprise, for example, one or more of a hard disk drive, a magnetic disk drive, an optical disk drive, or the like. The mass storage device 822 may include one or more non-transitory memories.

The video adapter 824 and the I/O interface 826 provide interfaces to couple external input and output devices to the processing unit 810. As illustrated in FIG. 8, examples of input and output devices include the display 814 coupled to the video adapter 824 and the mouse/keyboard 812 and the printer 816 coupled to the I/O interface 826. Other devices may be coupled to the processing unit 810.

The network interface 828, which may be a wired link and/or a wireless link, allows the processing unit 810 to communicate with remote units via the network 832. In an embodiment, the processing unit 810 is coupled to a local-area network or a wide-area network to provide communications to remote devices, such as other processing units, the Internet, remote storage facilities, or the like It should be noted that the computing system 800 may include other components. For example, the computing system 800 may include power supplies, cables, a motherboard, removable storage media, cases, a network interface, and the like. These other components, although not shown, are considered part of the computing system 800. Furthermore, it should be noted that any one of the components of the computing system 800 may include multiple components. For example, the CPU 818 may comprise multiple processors, the display 814 may comprise multiple displays, and/or the like. As another example, the computing system 800 may include multiple computing systems directly coupled and/or networked.

Additionally, one or more of the components may be remotely located. For example, the display may be remotely located from the processing unit. In this embodiment, display information, e.g., locations and/or types of abnormalities, may be transmitted via the network interface to a display unit or a remote processing unit having a display coupled thereto.

Although several embodiments and alternative implementations have been described, many other modifications and implementation techniques will be apparent to those skilled in the art upon reading this disclosure. In a given embodiment, the equation used to solve for the estimator function parameters can be defined such that its minimization or maximization selects the parameter matrix. The scale parameter for a given evaluation point can be calculated at runtime from the representation points directly, although good solutions for the scale parameter may be more costly to calculate without precalculation of per-representation point functions.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method for classifying an anomaly in a digital image, the method comprising:
receiving training data comprising a training feature value for each of a plurality of anomaly classification features for each of a plurality of training cases;
defining a neighborhood size for each of a plurality of representation points in feature space for each anomaly classification feature based on the training data;
receiving measured data comprising a measured feature value at an evaluation point in feature space for each anomaly classification feature for a measured case;
determining a scale parameter vector for at least some of the representation points near the evaluation point for each anomaly classification feature to define a respective neighborhood size for that anomaly classification feature;
determining a weight factor for the at least some of the representation points using the respective scale parameter vector; and
applying the weight factor for the at least some of the representation points to the training data at the plurality of representation points to generate a classification probability for the anomaly for the measured case at the evaluation point, wherein the scale parameter vector for a respective anomaly classification feature indicates the respective neighborhood size used to generate the classification probability at the evaluation point in feature space.

2. The method of claim 1, wherein receiving the training data comprises retrieving the training data from a database.

3. The method of claim 1, further comprising storing probability density function (PDF) estimates for the classification probability for the measured case in a database.

4. The method of claim 1, further comprising performing the receiving measured data, determining the scale parameter vector, determining and applying the weight factor, and generating the classification probability for a plurality of measured cases.

5. The method of claim 1, wherein the at least some of the representation points each represent multiple samples of the training data.

6. The method of claim 1, wherein receiving the training data and defining the neighborhood size are performed offline, and the neighborhood size for each of the plurality of representation points is stored in a database for later use in determining the scale parameter vector.

7. A system for classifying anomalies in a digital image, the system comprising:
a neighborhood definition unit receiving training data comprising a training feature value for each of a plurality of anomaly classification features for each of a plurality of training cases, and defining a neighborhood size for each of a plurality of representation points in feature space based on the training data;
a neighborhood determination unit receiving measured data comprising a measured feature value at an evaluation point in feature space for each anomaly classification feature for a measured case, and determining a scale parameter vector for at least some of the representation points near the evaluation point for each anomaly classification feature to define a respective neighborhood size for that anomaly classification feature;
a weight determination unit determining a weight factor for the at least some of the representation points using the respective scale parameter vector; and
a local estimator applying the weight factor for the at least some of the representation points to the training data at the plurality of representation points to generate a probability density function (PDF) estimate for an anomaly at the evaluation point, wherein the scale parameter vector for a respective anomaly classification feature indicates a respective neighborhood size used to generate the PDF estimate at the evaluation point in feature space.

8. The system of claim 7, wherein the neighborhood definition unit retrieves the training data from a database.

9. The system of claim 7, wherein the local estimator stores the PDF estimate for the measured case in a database.

10. The system of claim 7, wherein the at least some of the representation points each represent multiple samples of the training data.

11. The system of claim 7, wherein the neighborhood definition unit stores the neighborhood size for each of the plurality of representation points in a database for later use by the neighborhood determination unit.

12. A computer program product for classifying anomalies, the computer program product having a non-transitory computer-readable medium with a computer program embodied thereon, the computer program comprising:
computer program code for receiving training data comprising a training feature value for each of a plurality of anomaly classification features for each of a plurality of training cases;
computer program code for defining a neighborhood size for each of a plurality of representation points in feature space for each anomaly classification feature based on the training data;
computer program code for receiving measured data comprising a measured feature value at an evaluation point in feature space for a measured case;
computer program code for determining a scale parameter vector for at least some of the representation points near the evaluation point for each anomaly classification feature to define a respective neighborhood size for that anomaly classification feature;
computer program code for determining a weight factor for the at least some of the representation points using the respective scale parameter vector; and
computer program code for applying the weight factor for the at least some of the representation points to the training data at the plurality of representation points to generate a probability density function (PDF) estimate for an anomaly for the measured case at the evaluation point, wherein the scale parameter vector for a respective anomaly classification feature indicates a respective neighborhood size used to generate the PDF estimate at the evaluation point in feature space.

13. The computer program product of claim 12, wherein the computer program code for receiving the training data comprises computer program code for retrieving the training data from a database.

14. The computer program product of claim 12, further comprising computer program code for storing the PDF estimate for the measured case in a database.

15. The computer program product of claim 12, further comprising computer program code for performing the receiving measured data, determining the scale parameter vector, determining and applying the weight factor, and generating the PDF estimate for a plurality of measured cases.

16. The computer program product of claim 12, wherein the at least some of the representation points each represent multiple samples of the training data.

* * * * *